(12) United States Patent
Hull et al.

(10) Patent No.: US 7,818,235 B2
(45) Date of Patent: Oct. 19, 2010

(54) APPARATUS, METHOD AND SYSTEM FOR DETERMINING CREDIT DERIVATIVE INDICES AND ESTIMATING CREDIT DERIVATIVE CREDIT CURVES, AND A CREDIT CALCULATOR FOR VALUING CREDIT DERIVATIVES BASED ON THE CREDIT CURVES

(75) Inventors: John Campbell Hull, Etobicoke (CA); Alan Douglas White, Toronto (CA); Michael Gooch, Rumson, NJ (US); Matthew Woodhams, London (GB)

(73) Assignee: GFI Group Inc., New York, NY (US)

( * ) Notice: Subject to any disclaimer, the term of this patent is extended or adjusted under 35 U.S.C. 154(b) by 1619 days.

(21) Appl. No.: 10/366,500

(22) Filed: Feb. 14, 2003

(65) Prior Publication Data

US 2004/0162862 A1 Aug. 19, 2004

(51) Int. Cl.
*G06Q 40/00* (2006.01)
(52) U.S. Cl. .................................................. 705/36 R
(58) Field of Classification Search ....................... None
See application file for complete search history.

(56) References Cited

U.S. PATENT DOCUMENTS 1,927,702 A * 9/1933 Foss ........................... 705/36 R
5,377,095 A * 12/1994 Maeda et al. .................. 705/10

2004/0068413 A1 * 4/2004 Musgrove et al. .............. 705/1

OTHER PUBLICATIONS

"Valuing Credit Default Swaps I: No Counterparty Default Risk" by John Hull and Alan White, published in the Journal of Derivatives, vol. 8, No. 1, (Fall 2000), pp. 29-40.*
"Valuing Credit Default Swaps II: Modeling Default Correlations" by John Hull and Alan White, published in the Journal of Derivatives, vol. 8, No. 3, (Spring 2001), pp. 12-22.*
"Valuing Credit Default Swaps I: No Counterparty Default Risk" by John Hull and Alan White, published in the *Journal of Derivatives*, vol. 8, No. 1, (Fall 2000), pp. 29-40.
"Valuing Credit Default Swaps II: Modeling Default Correlations" by John Hull and Alan White, published in the *Journal of Derivatives*, vol. 8, No. 3, (Spring 2001), pp. 12-22.

* cited by examiner

*Primary Examiner*—Olabode Akintola
(74) *Attorney, Agent, or Firm*—Kenyon & Kenyon LLP

(57) ABSTRACT

An apparatus, method and system for determining an estimate of at least one numerical attribute of at least one entity of a population when the population is changing and there are a limited number of observations on the attribute for the entities, in which a conditional index is determined to track how a value of the attribute changes from one time to another for an entity that is a member of the population at both times, and an unconditional index is determined representing an average level of the attribute for the entities of the population.

21 Claims, 13 Drawing Sheets

Spread-change Indices, April 1, 2001 to May 24, 2002

Spread-level Indices: April 1, 2001 to May 24, 2002

Value of term structure parameter a, May 31, 2001 to May 24, 2002

Increase in CDS Spread per Year (bps)

| Markets - Entities | |
|---|---|
| Entity: | Prudential Financial Inc |
| Setting | Default Value |
| Entity Name | Prudential Financial Inc |
| Rating | A3 |
| Sector | Insurance -Life |
| GFI Key | US:PRU |
| Ccy | USD |
| Ref Bond | No |
| Bond Maturity | |
| Bond Coupon | |
| Bond Day Base | 30/360 |
| Bond Frequency | Semi-Annual |
| Bond EOM | Yes |
| Prev Cpn Date | |

FIG. 8G

| Base Curve | Adjustment | Pricer Curve | Default Prob |
|---|---|---|---|
| 78.4 | +5.0 | 83.4 | 0.009 |
| 79.8 | +5.0 | 84.8 | 0.017 |
| 82.5 | +5.0 | 87.5 | 0.036 |
| 85.2 | +5.0 | 90.2 | 0.055 |
| 87.9 | +5.0 | 92.9 | 0.075 |
| 90.6 | +5.0 | 95.6 | 0.095 |
| 96.0 | +5.0 | 101.0 | 0.138 |
| 104.1 | +5.0 | 109.1 | 0.209 |

| | LIBOR |
|---|---|
| 1W | 1.27/1.30% |
| 1M | 1.30/1.33% |
| 2M | 1.29/1.32% |
| 3M | 1.31/1.34% |
| 6M | 1.34/1.37% |
| 9M | 1.40/1.43% |
| 1Y | 1.53/1.56% |
| 1.5Y | |
| 2Y | 2.08/2.11% |
| 2.5Y | |
| 3Y | 2.64/2.66% |
| 3.5Y | |
| 4Y | 3.07/3.10% |
| 4.5Y | |
| 5Y | 3.44/3.46% |
| 6Y | 3.72/3.76% |
| 7Y | 3.97/4.00% |
| 8Y | |
| 9Y | |
| 10Y | 4.48/4.51% |
| 12Y | |
| 15Y | |

FIG. 8J

Markets - Market Conventions
Currency: USD

| Setting | Default Values |
|---|---|
| Notional | 5.00 MM |
| Term | 5y |
| Daybase | Act/360 |
| Pmt Frequency | Quarterly |
| Settle Days | 1 |
| Bus Day Adj | None |
| Stub Dates | Front |
| Pay Accrued | Yes |

FIG. 8K

Entity Details
- GFI Key: US:PD
- Entity: Phelps Dodge
- Sector: Mining Diversified
- Rating: Baa3

CDS Details
- Structure: CDS Call
- Class: Senior
- Term: Oddx5
- Dir: Buy
- Notional: 15.00 MM
- Ccy: USD
- Pay Accrued: Yes
- Ref Bond: No
- Digital: No

My Details
- Strike: 332.0
- Expiry Date: 3 Jan 04
- Volatility: 33.00%
- Price: 3.623777
- Recovery Rate: 52.00%
- Dealt Price: 1.578121

Option Details
- Strike: 332.0
- Expiry Date: 3 Jan 04
- Volatility: 33.00%
- Price: 1.472895
- Premium: $ -220,934.32

Pricing Mechanism
- Math Model: Hull And White
- Recovery Rate: 52.00%
- Benchmark: Ford Motor Corp
- Bnchmk Term: Interpolated
- Curve Choice: Default Probability
- Curve Adj: -10.0%

Calculations
- Default Spread: 56.3
- Default Prob: 0.035
- Spread PV01: $ -2,115
- All-in Value: $ -13,437
- Accrued Interest: $ 1,250
- Market Value: $ -12,187
- Accrued Days: 12

CDS Dates
- Today: 3 Jan 03 9:16
- Value Date: 6 Jan 03
- Effective Date: 3 Jan 04
- Maturity Date: 3 Jan 09
- Daybase: Act/360
- Pmt Frequency: Quarterly
- End of Month: No
- Stub Dates: Front
- First Payment: 3 Apr 04
- 2nd Last Pmt: 3 Oct 08
- Bus Day Adj: None
- Settle Days: 1

Reference Bond
- Bond Coupon: 5.87500%
- Bond Maturity: 30 Sep 12
- Prev Cpn Date: 30 Sep 02
- Bond Day Base: 30/360
- Bond Frequency: Semi-Annual
- Bond EOM: Yes

Trade Details
- Trade Date: 24 Dec 02
- Dealt Spread: 50.0
- Dealt Price:

APPARATUS, METHOD AND SYSTEM FOR DETERMINING CREDIT DERIVATIVE INDICES AND ESTIMATING CREDIT DERIVATIVE CREDIT CURVES, AND A CREDIT CALCULATOR FOR VALUING CREDIT DERIVATIVES BASED ON THE CREDIT CURVES

FIELD OF THE INVENTION

The present invention relates to an apparatus, method and system for determining credit derivative indices and estimating credit derivative credit curves, and a credit calculator for valuing credit derivatives based on the credit curves.

BACKGROUND INFORMATION

In the financial markets, there are various types of credit derivative financial instruments. A credit default swap (CDS) is one type of credit derivative. A CDS allows credit risks to be traded and managed in a manner similar to that of market risks. A CDS is a contract that provides insurance against default by a particular company. With a CDS, a seller receives a fee in exchange for making a contingent payment if there is a Credit Event (default) of the Reference Entity (the company). The Credit Event may be a bankruptcy, an insolvency, a receivership, a material adverse restructuring of debt, or a failure to meet payment obligations when due. The CDS buyer has the right to sell the Reference Obligation, at the Reference Obligation's par value, when the Credit Event occurs. The total par value of the Reference Obligation (bond) that may be sold is the notional principal of the CDS. The contingent payment may be in cash or may involve the physical delivery of the Reference Obligation. The "spread" of the CDS is the total of the payments per year, as a percent of the notional principal. The spread may be indicated in basis points, where 100 basis points correspond to one percent.

In particular, the buyer of the CDS makes periodic payments to the seller until the end of the life of the CDS or until a Credit Event occurs. A Credit Event usually requires a final accrual payment by the buyer. The credit default swap is then settled by providing physical delivery or cash. If the credit default swap terms require physical delivery, the swap buyer delivers the bonds to the seller in exchange for their par value. If there is a cash settlement, the "calculation agent" polls dealers to determine the mid-market price (Q) of the reference obligation a specified number of days after the Credit Event. The cash settlement is then (100−Q) percent of the notional principal.

Thus, with a CDS, a buyer gains credit protection on the Reference Entity and a seller assumes the default risk of the Reference Entity.

On any given trading day, there may or may not be an actual value quoted for the spread of a CDS having a particular term and/or for a particular company. If there is no quote for such a CDS spread, then the CDS spread (for a particular company and/or having a particular term) must be estimated.

The CDS spread (for a particular company and/or having a particular term) may be part of a rating category associated with a particular credit rating or a particular industry sector, such as, for example, aerospace, automotive, steel, etc. Spreads for companies in a particular rating category are not the same, but have a tendency to move together. The companies in a particular rating category change through time. Based on trading information, the CDS spreads have been commonly quoted for instruments that have maturities of approximately five years.

SUMMARY OF THE INVENTION

An exemplary embodiment and/or exemplary method of the present invention concerns the determining of at least one estimated attribute of at least one entity of a population of interest, in which the entities in the population of interest change through time, in which for any entity in the population, the at least one estimated attribute changes through time and there is a tendency for the attributes associated with different entities in the population to move together, and in which on a particular day, there are observations on the at least one attribute for some entities.

The exemplary embodiment and/or exemplary method may include determining a conditional index for the attribute. This conditional index tracks how the value of the attribute for an entity in the population may be expected to change from one time to another on the condition that the entity is a member of the population at both times.

In particular, the exemplary embodiment and/or exemplary method is directed to determining an estimate of at least one numerical attribute of at least one entity of a population of entities, in which the population changes and there are a limited number of observations on the at least one numerical attribute for the at least one entity, which includes: determining a conditional index to track how a value of the at least one numerical attribute changes from one time to another for an entity, in which the entity is a member of the population at both times; and determining an unconditional index representing an average level of the attribute for the entities that are in the population at a particular time.

In the exemplary embodiment and/or exemplary method, the determining of the conditional index for the particular time may be performed by calculating a maximum likelihood estimator for the conditional index for the particular time.

In the exemplary embodiment and/or exemplary method, the relationship between the value of the attribute and the conditional index may be defined by $x_{ij}=I_i+a_j+e_{ij}$, where $x_{ij}$ is the value of the attribute for the jth entity of the population on day i, $I_i$ is the level of the conditional index on day i, $a_j$ is a constant associated with the jth entity of the population, and the $e_{ij}$ have independent identically distributed distributions.

The exemplary embodiment and/or exemplary method may further include estimating the value of the attribute for at least one entity in the population, when the last observation on the attribute was k days earlier, as $x_{i-k,j}+I_i-I_{i-k}$.

In the exemplary embodiment and/or exemplary method, the relationship between the value of the attribute for a particular entity in the population and the conditional index may be defined by a model of $\ln(x_{ij})=\ln(I_i)+\ln(a_j)+\ln(e_{ij})$, where $x_{ij}$ is the value of the attribute for the jth entity of the population on day i, $I_i$ is the level of the conditional index on day i, $a_j$ is a constant associated with the jth entity of the population, and the $e_{ij}$ have independent identically distributed distributions.

The exemplary embodiment and/or exemplary method may further include estimating the attribute value for at least one entity in the population when the last observation on the attribute value was k days earlier than day i as $x_{i-k,j}(I_i/I_{i-k})$.

In the exemplary embodiment and/or exemplary method, determining an unconditional index for the attribute may be based on the observations on the attribute and estimates of the value of the attribute. The unconditional index uses the value of the attribute for a particular entity on a day, conditional only on the entity being part of the population on that day, where the unconditional index represents an average level of the attribute for the entities that are in the population at a particular time.

In the above exemplary embodiment and/or exemplary method, the population may include a group of companies having the same credit rating.

In the above exemplary embodiment and/or exemplary method, the attribute values may include credit derivative pricing data.

In the above exemplary embodiment and/or exemplary method, the attribute value may include credit default swap spread data for five-year credit default swaps.

In the above exemplary embodiment and/or exemplary method, other less-frequently-observed attributes of the entity of the population may be determined using a regression analysis where weights decline exponentially back through time. The less-frequently observed attributes may be non-five-year credit default swap spreads.

The exemplary embodiment and/or exemplary method may further provide a graphical-user-interface to display a data curve for an entity based on the at least one numerical attribute, where for the entity, the data curve includes numerical attributes determined using the conditional index and the unconditional index.

Another exemplary embodiment and/or exemplary method of the present invention provides for determining at least one estimated financial attribute of at least one entity of a population, by: providing financial attribute data for entities of the population, wherein the financial attribute data is for a period of time, and the period of time includes a particular day and prior days; determining a conditional index using prior conditional indices, actual financial attribute data for the particular day and actual financial attribute data for the prior days by calculating a maximum likelihood estimator for the conditional index for the particular day; and determining an unconditional index representing an average level of the financial attribute data for the entities of the population.

Another exemplary embodiment and/or exemplary apparatus of the present invention provides for an apparatus for determining an estimate of at least one numerical attribute of at least one entity of a population of entities. The population changes and there are a limited number of observations on the at least one numerical attribute for the at least one entity. The apparatus may include a first arrangement to determine a conditional index to track how a value of the at least one numerical attribute changes from one time to another for an entity, which is a member of the population at both times, and a second arrangement to determine an unconditional index representing an average level of the attribute for the entities that are in the population at a particular time.

Another exemplary embodiment and/or exemplary apparatus of the present invention provides for an apparatus for determining at least one estimated financial attribute of at least one entity of a population, where the apparatus may include a first arrangement to provide financial attribute data for entities of the population, where the financial attribute data is for a period of time and the period of time includes a particular day and prior days, and a second arrangement to determine a conditional index for the particular day and for a particular entity based on a relationship of prior conditional indices, actual financial attribute data for the particular day and actual financial attribute data for the prior days by calculating a maximum likelihood estimator for the conditional index for the particular day, and a third arrangement to determine an unconditional index representing an average level of the financial attribute data for the entities of the population, and a fourth arrangement to determine the at least one estimated financial attribute for the at least one entity based on the unconditional index.

Another exemplary embodiment of the present invention provides for a computer-readable storage medium including program code for determining an estimate of at least one numerical attribute of at least one entity of a population of entities, where the population changes and there are a limited number of observations on the at least one numerical attribute for the at least one entity, in which the program code is executable in a processor arrangement to perform: determining a conditional index to track how a value of the at least one numerical attribute changes from one time to another for an entity, the entity is a member of the population at both times; and determining an unconditional index representing an average level of the attribute for the entities that are in the population at a particular time.

Another exemplary embodiment of the present invention provides for a computer-readable storage medium including program code for determining at least one estimated financial attribute of at least one entity of a population, where the program code is executable in a processor arrangement to perform: providing financial attribute data for entities of the population, where the financial attribute data is for a period of time and the period of time includes a particular day and prior days; determining a conditional index for the particular day and for a particular entity based on a relationship of prior conditional indices, actual financial attribute data for the particular day and actual financial attribute data for the prior days by calculating a maximum likelihood estimator for the conditional index for the particular day; determining an unconditional index representing an average level of the financial attribute data for the entities of the population; and determining the at least one estimated financial attribute for the at least one entity based on the unconditional index.

BRIEF DESCRIPTION OF THE DRAWINGS

FIG. 8G shows a "Markets-Entities" data section of the "Markets" data section of the GUI of FIG. 8A.

FIG. 8H shows the "Markets-Credit Curves" data section of the "Markets" section of the GUI of FIG. 8A.

FIG. 8I shows the "Markets-LIBOR" data section of the "Markets" section of the GUI of FIG. 8A.

FIG. 8J shows the "Markets-Market Conventions" data section of the GUI of FIG. 8A.

FIG. 8K shows the complete "Details" data section of the "Details" data section of the GUI of FIG. 8A.

DETAILED DESCRIPTION

For a certain population of interest there are a number of entities, some of which are members of the population of interest at any given time. For example, the population of interest may be all entities or companies having a particular credit rating or that comprise a particular industry sector, such as, for example, aerospace, automotive, steel, etc. The set of entities that are members of the population, however, will change through time. In this regard, for example, a particular company having a credit rating of A might be downgraded to Baa or upgraded to Aa, and therefore leave the population of companies having a credit rating of A. Likewise, a company having a credit rating of Aa may be downgraded to A, and therefore join the population of companies having a credit rating of A.

Furthermore, there will be certain quantifiable attributes of the entities that may be of interest, such as, for example, the price of a financial instrument. In particular, for example, the attribute of interest may be the spread for Credit Default Swap (CDS) instruments, including CDS options (calls or puts) and Cancelable CDS (CCDS) instruments, which are structured using call and put CDS options. For a particular trading day, there may be an observation of a particular attribute for only some and not all of the entities that are members of the population of interest on that day.

In an exemplary apparatus, method and system of the present invention, an index tracking the value of an attribute for all entities that are members of the population each day (such as, for example, an index of CDS spreads for all companies having a credit rating of A) may first be determined, and then the attribute(s) for a member of the population are estimated for a day when no observation is available on the attribute(s) for that particular member. In this regard, for example, a spread attribute for a credit derivative instrument may be estimated for a particular member of the population of interest. As explained, for example, the spread attribute may be the spread of a CDS-type instrument, or some other credit derivative or other financial instrument.

While one way to determine the index tracking the value of an attribute would be to average the observations available on the attribute for entities that are members of the population each day, it is believed that in various circumstances and/or for various conditions, it is believed that this approach may produce an index that is too volatile because the members of the population for which observations are available may differ each day.

Figure 1:
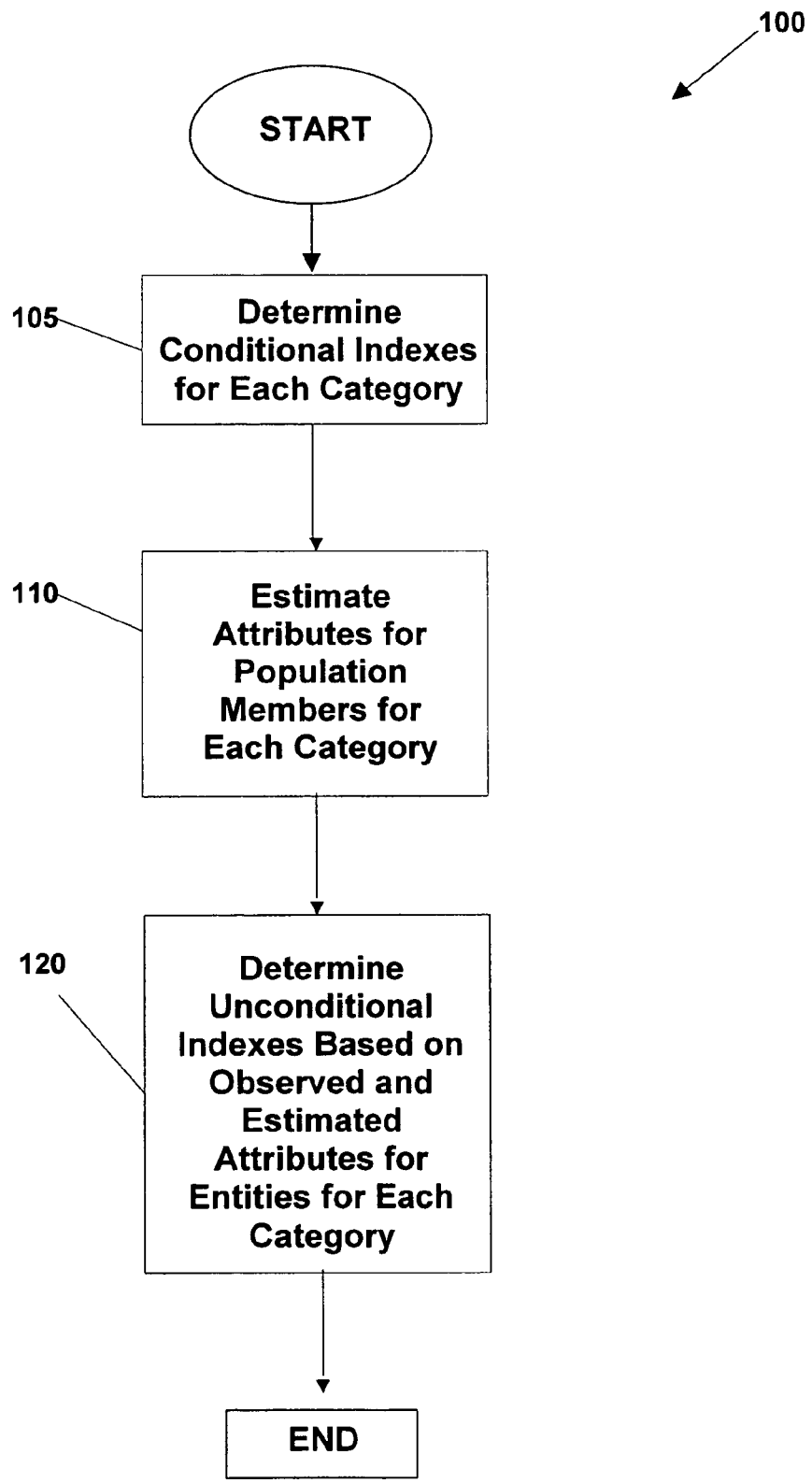
FIG. 1 shows an exemplary method of the present invention.

FIG. 1 shows an exemplary method of the present invention. The exemplary method may be implemented in software using a suitably appropriate processor arrangement, which may communicate with other processor arrangements through an Internet/networking arrangement, as in the exemplary system of FIG. 2.

In step 105 of the method 100, the system determines a conditional index that describes the average behavior of a particular attribute over a period of time (such as a number of days) for a particular entity. The index is a conditional index because it is conditional on the entity being a member of the population during the period. Thus, for example, the conditional index may describe average changes in the spread of a CDS for a company having a credit rating of A. When the actual observations for members of the population are not available from an observational database having the observed attribute data, in step 110, the system estimates attributes for members of the population on those days or at those times when actual observations are not available, and this is performed based on the conditional index. In step 120, the system determines an unconditional index by averaging the attribute across both actual observations of the attribute(s) and estimated "observations" of the attribute(s).

To determine the conditional index, the system uses a model relating the value of the attribute for a particular member of the population to the conditional index. Examples of the models that may be used include, for example, the following ones: (1) $x_{ij} = I_i + a_j + e_{ij}$; and (2) $\ln x_{ij} = \ln I_i + \ln a_j + \ln(e_{ij})$ (which may also be expressed as $\ln x_{ij} = \ln(a_j I_i) + \ln(e_{ij})$), where $x_{ij}$ is the value of the attribute of jth member of the population on day i, $I_i$ is the level of the index on day i, $a_j$ is a constant associated with the jth member of the population, and each of the error terms $e_{ij}$ has independent identically distributed distributions. The index $I_i$ is arbitrarily set to 100 or some other number for one particular day. Available statistical procedures are then used to determine a maximum likelihood estimator for the value of the index $I_i$ on day i from its value on previous or prior days, the observations of the attribute on day i, and the observations of the attribute on previous days.

In particular, in step 110 of the method 100, the system uses the conditional index to calculate or determine estimated "observations" of attribute(s) for members of the population when actual observations are not available. In this regard, assume that it is day i and the attribute was last observed for a particular member of the population k days ago (that is, on day i–k). The system uses the model(s) described above (or some other suitably appropriate model) to calculate or determine an unbiased estimate of the value of the attribute on day i. For the first model of equation (1), an appropriate estimate would be $\hat{x}_{ij} = x_{i-k,j} + I_i - I_{i-k}$, and for the second model of equation (2), an appropriate estimate would be $\hat{x}_{ij} = x_{i-k,j} I_i / I_{i-k}$, where $\hat{x}_{ij}$ is the estimate of the attribute for the jth member of the population on day i.

In step 120 of the method 100, for one or more populations (or categories), the system calculates or determines the unconditional index for each by averaging the particular attribute across both actual observations and estimated "observations" of the attribute. To calculate or determine the unconditional index on a particular day, the system considers those entities that satisfy the following conditions: (1) the entity is currently a member of the population of interest; and (2) the entity was a member of the population at the time of the most recent observation on the entity. For these entities, there is either a current observation of the attribute or a current estimated value of the attribute. For a population of interest, the system then determines the unconditional index by averaging across the set of current observations and the current estimated values of the attribute for the entities that satisfy both of these conditions.

Figure 2:
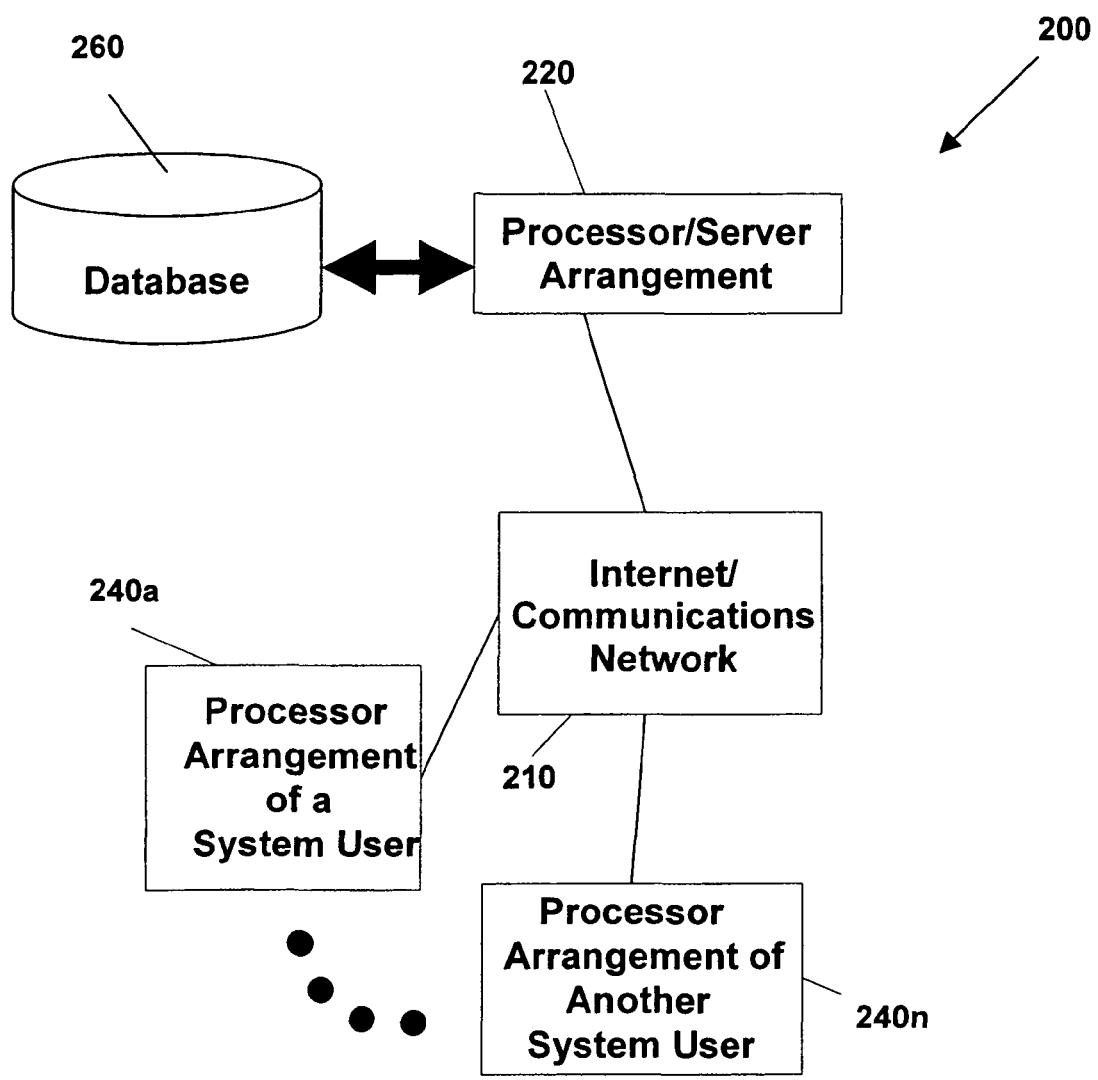
FIG. 2 shows an exemplary system for use with the exemplary method of FIG. 1 or FIG. 3.
Figure 3:
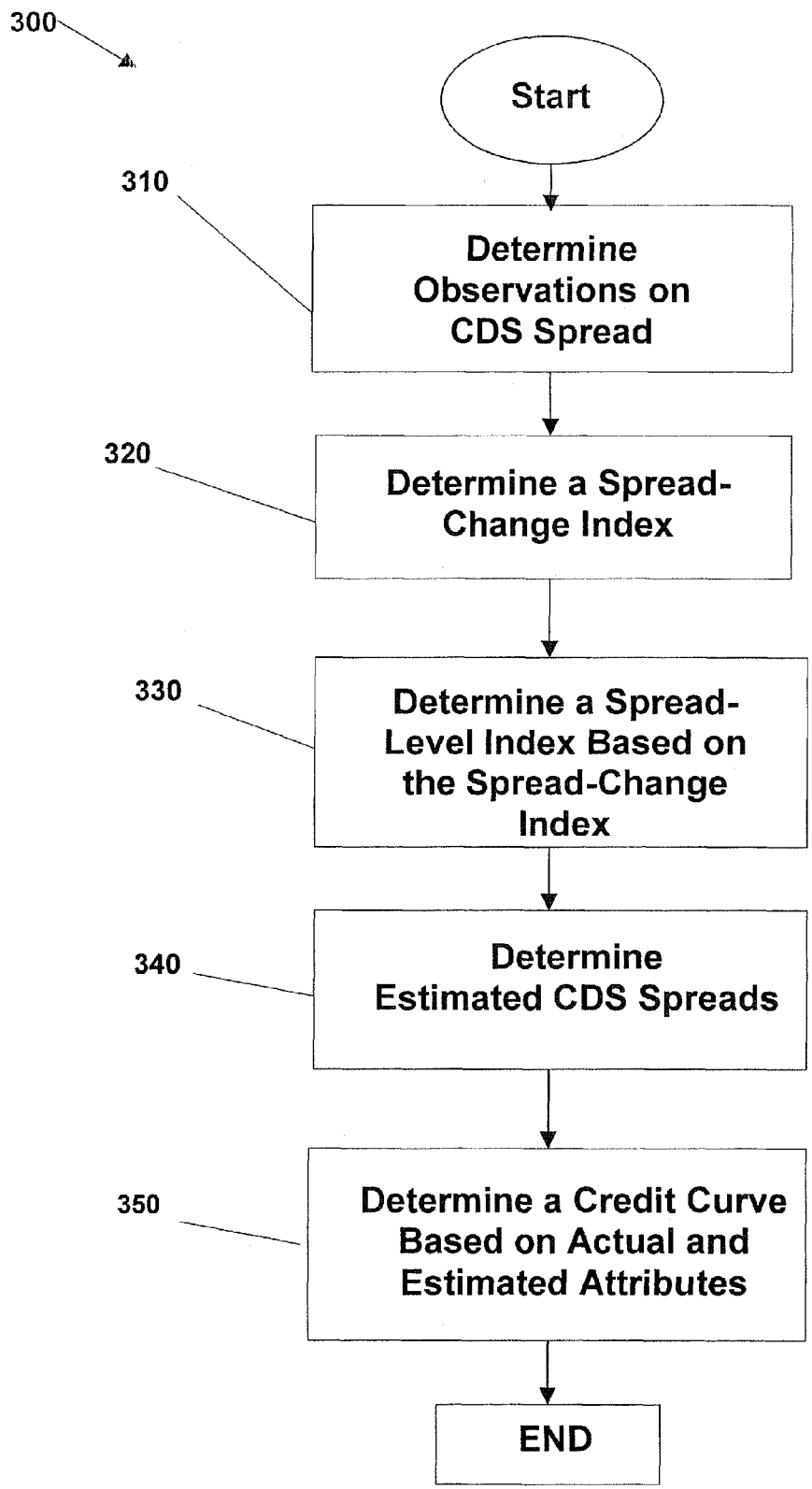
FIG. 3 shows the exemplary method applied for use with CDS spreads.

FIG. 2 shows an exemplary system 200 for implementing or performing the exemplary method 100 of FIG. 1 and the method 300 of FIG. 3, as described herein. The system is configured to execute a program implementing the exemplary method 100 of FIG. 1. In particular, exemplary processor arrangement 220 executes a program to perform the method (s) described herein. The processor arrangement 220 may include or be associated with a computer server arrangement. The program and its instructions (which may be an Applet in the Java programming language) for implementing the exemplary methods are accessible and executable by the processor arrangement 220. The program may be stored in an associated storage arrangement of the processor arrangement, which may be a compact disk, hard drive, DVD-ROM, CD-ROM or any other suitably appropriate and accessible computer-readable storage arrangement and/or medium, as is well understood. Storage arrangements may be included in or otherwise accessible by the processor arrangement 220, as well as the processor arrangements 240a, 240b, 240c, . . . , 240n of various system user(s). Within the system 200, a system user may use the processor arrangement 240a, 240b, 240c, . . . , 240n to obtain or view the conditional index value, the actual or estimated value(s) of the attribute of an entity, and/or the unconditional index that is based on the conditional index, as well as the trading information at the database 260, which may also be used to store the various index data described herein. The processor arrangements of the system may include a personal computer, a computer network, a wireless computer or processor device or arrangement (such as, for example, a PDA) or a wireless computing network, or any other suitably appropriate processor arrangement. The processor arrangements 240a, 240b, 240c, . . . , 240n of the system user(s) may communicate with the processor arrangement 220 via a communications network 210, which may be Internet-based.

The processor arrangement 220, uses the program (which may be an Applet, in Java, for example, and which implements the exemplary method) stored at an associated and/or accessible storage arrangement to calculate or determine the conditional index, to determine the actual or estimated attribute value(s), and/or the unconditional index by using the exemplary methods described herein. The database 260 or other storage arrangements store the values of the attribute(s) for the various population entities (associated with different credit rating or industry sector categories, for example), and may include a database of trading information on various financial instruments, including credit derivatives, such as CDS instruments, which will have various financial terms, including various maturity terms.

The processor arrangement 220 obtains trading data information from and stores such data at the database 260 or other storage arrangements, and may also store the determined indices and estimated "observation" data at the database 260 or other storage arrangements. The storage arrangements (including for the database 260) may be accessible via the Internet/communications network 210. The processor arrangement 220 may use the Internet/communications network 210 to communicate the conditional indices, the actual or estimated values for the attributes and/or the unconditional indices to the processor arrangements 240a, 240b, 240c, . . . , 240n of the system users.

In a particular example of the exemplary method, the indices of the spreads of CDS instruments may be determined. A trading database having CDS trading (buy and sell quote) information is referenced to obtain the CDS spread data for determining the conditional and unconditional indices of CDS spreads for the following exemplary credit ratings categories of Aaa and Aa, A, and Baa. In particular, the trading database principally reflects the trading data for five-year CDS instruments. Both sovereigns and corporations may be included. The exemplary method is used to determine estimates of the CDS spread for any name and any maturity on any day, based on the trading data for the five-year CDS spreads. The indices may be calculated or determined once a day or they may be continuously updated on an intra-day basis.

First, two indices of five-year CDS spreads are determined for each rating category. The five-year term for CDS spreads is associated with the majority of trading, so that the use of 5-term CDS spreads only reflects the fact that such instruments have been more commonly used. For CDS spreads, the two indices may be referred to as the spread-change index and the spread-level index, which respectively correspond to the conditional index and unconditional index. The system uses the spread-change index to estimate observations for entities (companies or names) when actual observations are not available for a particular day. The percentage change in a particular rating category's spread-change index between day $n_1$ and day $n_2$ is an estimate of the percentage change in the mid-market five-year spread (or some other base term spread) between day $n_1$ and day $n_2$ for entities (companies or names) that are in the rating category on both days. The value of the spread-level index for a particular rating category on a particular day represents the average mid-market five-year spread for entities (companies or names) in the rating category on that day.

For outside users of this financial information, only the spread-level index may be reported. This enables users to determine whether the spread observed or estimated for a particular entity on a particular day is high or low relative to the average for the population to which the entity belongs. Thus, a user may obtain this information through the Internet/communications network from the processor arrangement 220, for example.

In particular, FIG. 3 shows the exemplary method 300 for determining the spread-change index and spread-level index, and for determining estimates of the various CDS spreads for a particular company (name) or on a particular day (at a particular time, which may be at the end of a trading day). The entities are members of a particular category (such as a credit rating category, or an industry category, for example) at a particular point in time. The spread-change index and the spread-level index may be calculated or determined once a day (such as at the end of the day), or they may be continuously determined at any point in a day if the method is performed on an intra-day basis, rather than at the end of a trading day.

In step 310, the system determines the actual trading observations to be used for a CDS of a particular entity. This may be done in a variety of ways. For example, when there are both bids (offers to buy) and offers (offers to sell) the trading observation may be set equal to the average of the maximum bid and minimum offer in the last trading day or over some other recent time period. The determined observation may be stored at the database 260. The bid and offer quotes used to determine an observation do not have to be simultaneous quotes, so that, for example, the bid quote could be at 10 am and the offer quote could be at 1 pm on a particular day. To better ensure that the bids and offers are reasonably close and not too far apart, the system may require that at least one of the following two conditions be satisfied:

$a<(\text{minoffer}-\text{maxbid})/(0.5*(\text{minoffer}+\text{maxbid}))<b;$ and $c<(\text{minoffer}-\text{maxbid})<d.$ where a, b, c, and d are positive or negative constants. The purpose of this bid/offer quote restriction is to eliminate or at least reduce data errors and situations where the bid and offer quotes are sufficiently far apart that the trading data may provide little information about the mid-market CDS spread of the company.

Thus, in step 310, the system determines or obtains attribute values or observations for a plurality of entities, where each entity is a company or name that is a member of a particular category. In the exemplary embodiment, the category may be a credit rating category (such as, for example, Aaa, Aa, A, and Baa), or an industry sector (such as, for example, automotive, aerospace, biotech, etc.) In step 310, the system calculates or determines attribute observations from the attribute database. In the exemplary embodiment, the buy/sell quote trading history of a particular entity is for a particular parameter or object, such as the CDS instrument and its spread, and attributes are obtained for each of the plurality of entities in the particular category.

In step 320 of the exemplary method, the system determines a conditional index that is a spread-change index for all entities of each credit rating category for each day. To provide an initialization or stabilization period, the spread-change index may be started or determined some fixed period before the system is fully operational. This initialization or stabilization period may be, for example, about 80 business days in the case of five-year CDS spreads. It is believed that the spread-change index requires an initialization period (such as, for example, 80 days) to provide better predictive results. The spread-change index $I_i$ is the value of the index on day i. The value of the spread-change index $I_i$ is set (arbitrarily) to 100 for each of the first $N_1$ days. The $N_1$ parameter has a value of 5 days for the particular CDS example.

To determine the spread-change index $I_i$ on a subsequent day, entities are identified for which: (1) there is an observation for the entity on the day; (2) there is an observation for the entity on at least one of the previous $N_1$ days; and (3) the entity is in the particular credit rating category at the time of both observations.

If on day n, there are m entities (companies or names) that satisfy this condition and if m is less than 5, then the system sets $I_n$ to $I_{n-1}$. If m is greater than 5, then the following equation may be defined as follows: $u_j = \ln I_{n-k(j)} + \ln x_{n,j} - \ln x_{n-k(j),j}$, where $x_{ij}$ is the observation on the jth of the m entities on day i and k(j) is the number of days before day n on which the most recent observation occurs for this entity. This means that the jth entity has observations on day n and on day n-k(j).

In the exemplary method, the parameter Q is defined as the mean of $\{u_1, u_2, \ldots u_m\}$, and the spread-change index for a particular category on day n is defined as $I_n = \exp(Q)$. To reduce the effect of extreme observations the exemplary method may use the median rather than the mean of $\{u_1, u_2, \ldots u_m\}$ because it is believed to be more resistant to extreme or outlying observations than a simple average.

In step 330 of the exemplary method, the system determines the unconditional index or the spread-level index. In particular, the system determines the spread-level index for a particular credit rating category for day n by using the spread-change index for that particular credit rating category to calculate or determine estimated values of the attribute for all entities (companies or names) on day n that satisfy the following conditions: (1) there is no observation for the entity on day n; (2) there is an observation for the entity on at least one of the $N_2$ days preceding day n (where $N_2$ is a parameter whose value is described herein as 30 days for five-year CDS spread data, but which may differ (especially based on the particular trading database used)); and (3) the entity is in the credit rating category today and was in the rating category at the time of the most recent observation.

Thus, for example, if a particular entity satisfies these conditions and if the most recent observation for the entity is on day n-q, then the system determines the estimated observation for that entity on day n as the actual observation on day n-q multiplied by the ratio of $I_n/I_{n-q}$ (that is, the spread-change index $I_n$ on day n divided by the spread-change index $I_{n-q}$ on day n-q). If there are g actual observations on day n and if h estimated observations are determined by the system (in the manner described above), then this provides a total of (g+h) CDS spreads (or other attribute values for a particular category) for day n. The system then determines the spread-level index for day n as a central value of these (g+h) CDS spreads (or other attribute values for a particular category). The central value may be the mean or, to reduce the impact of extreme observations, the median.

Next, in step 340 of the method, the system determines the attribute(s) for one or more of the particular entities on a particular day. In particular, the system determines the attribute (such as, a five-year CDS spread) as follows. First, if there was an observation on a particular entity on the prior day (or some other time interval), then the system sets the five-year CDS spread equal to that prior observation. Second, if there was no observation on the prior day, but there was an observation in the last $N_3$ days (where $N_3$ is a parameter whose value is described herein as 50 days for five-year CDS spreads), then the system sets the estimated five-year CDS spread equal to an estimated observation for the entity. The system determines estimated observations, based on the spread-level index as described above, where the estimated observation for a particular entity (company or name) on a day n is determined by multiplying the ratio of the spread-change index $I_n$ on day n to the prior spread-change index $I_{n-q}$ on day n-q, ($I_n/I_{n-q}$), by the most recent actual observation on day n-q. Third, if the entity has not traded in the last $N_3$ days, then the system sets the five-year CDS spread equal to the current value of the spread-level index for the credit rating category associated with the entity.

In step 350, a credit curve is determined. The credit curve may be based on actual attribute values and estimated attribute values.

In an exemplary use, CDS spread "pricing" software (which may be an Applet in the Java programming language, for example) may be used to determine the five-year CDS spread for particular companies and this may then be used to value other credit derivatives. Exemplary user interfaces for such software are shown in FIGS. 8A to 8L.

Figure 8A:
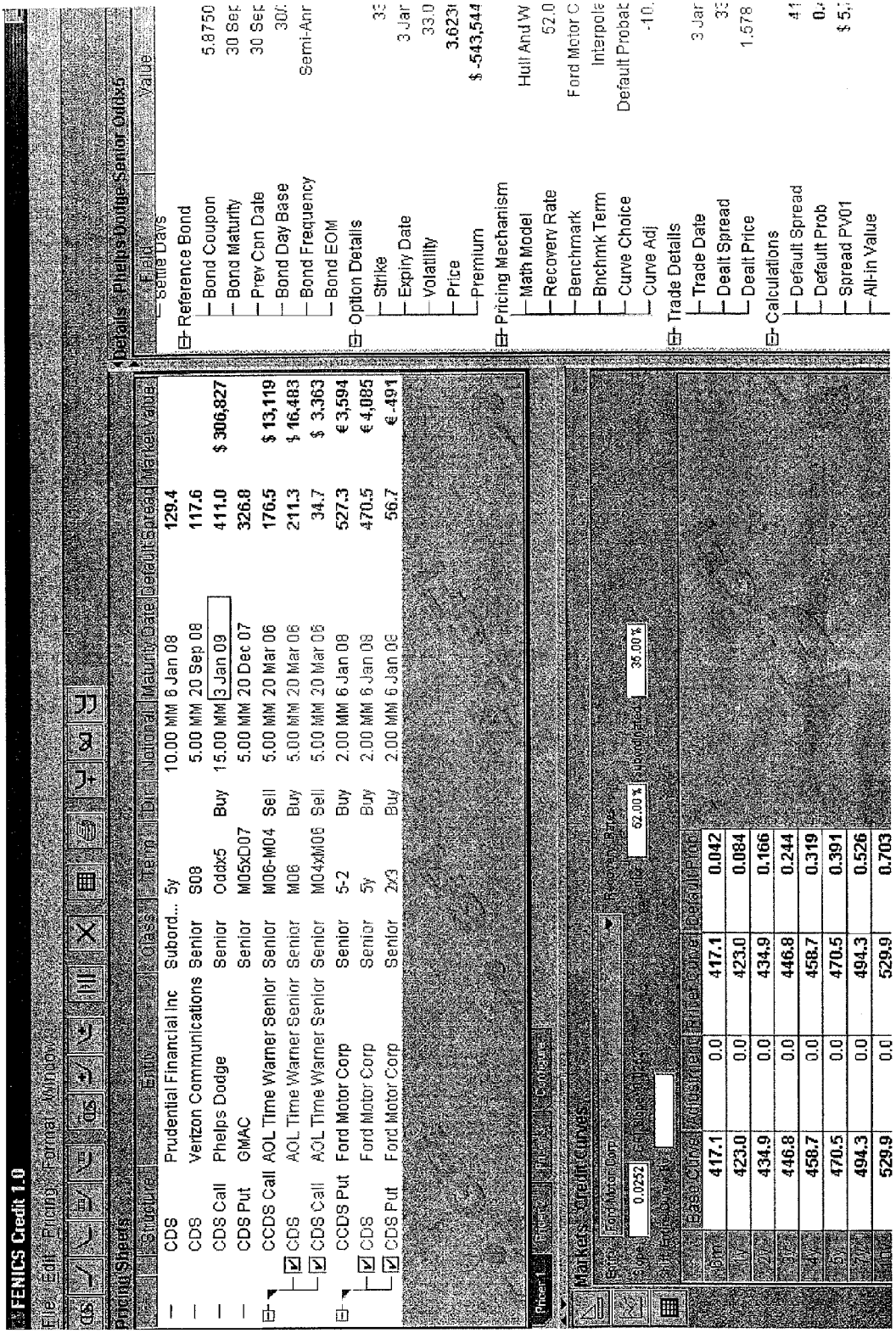
FIG. 8A shows a graphical-user-interface of credit calculator software (implemented as an Applet in the Java programming language), which shows a menu structure, a corresponding icon structure for alternately implementing the various menu selections, a "Pricing" section for a list of entities and their financial instrument data, a "Market" section for an entity, and a "Details" section for an entity.

FIG. 8A shows a graphical-user-interface of credit curve (data curve) calculator software (implemented as an Applet in the Java programming language for processors 220 and/or 240), which shows a menu structure, a corresponding icon structure for alternately implementing the various menu selections, a "Pricing" section for a list of entities and their financial instrument data, a "Market" section for an entity, and a "Details" section for an entity.

Figure 8B:
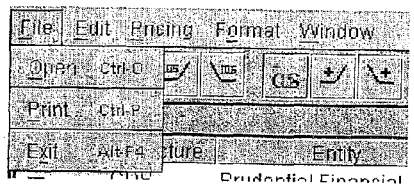
FIG. 8B shows a "File" pull-down menu of the GUI of FIG. 8A.
Figure 8C:
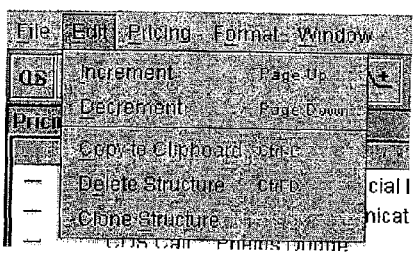
FIG. 8C shows an "Edit" pull-down menu of the GUI of FIG. 8A.
Figure 8D:
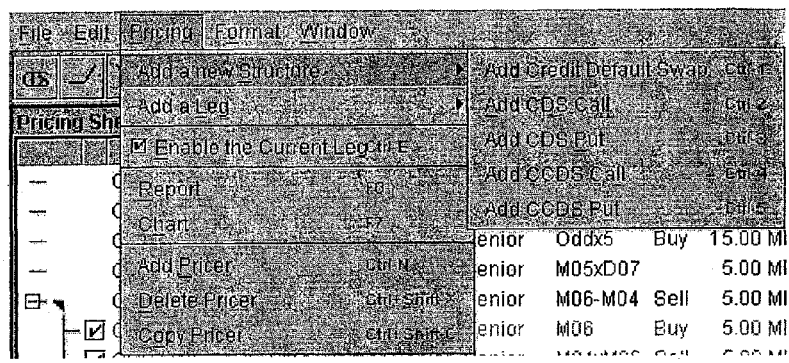
FIG. 8D shows a "Pricing" pull-down menu of the GUI of FIG. 8A.
Figure 8E:
FIG. 8E shows a "Format" pull-down menu of the GUI of FIG. 8A.
Figure 8F:
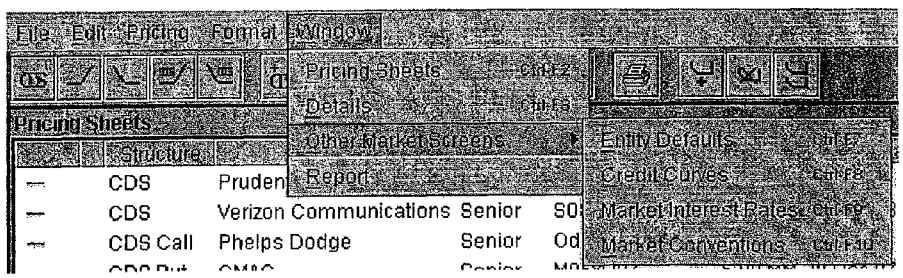
FIG. 8F shows a "Window" pull-down menu of the GUI of FIG. 8A.
Figure 8L:
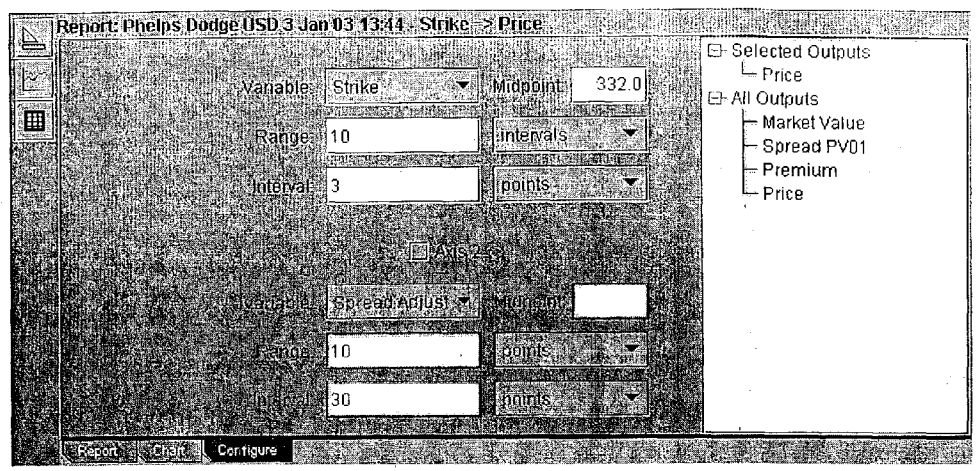
FIG. 8L shows sample "Configure" data for the gridded-square "Report" icon of the GUI (or its corresponding "Report" selection of a pull-down menu) of FIG. 8A.
Figure 8M:
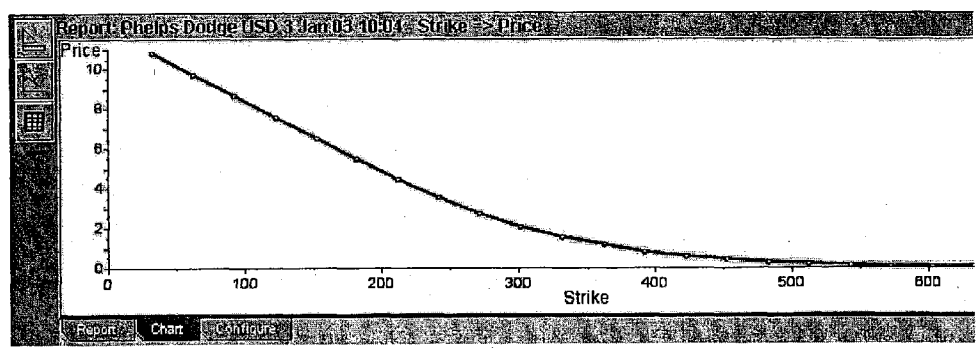
FIG. 8M shows a sample "Chart" of the "Report" based on the sample "Configure" data of FIG. 8L.

With respect to the GUI of FIG. 8A, FIG. 8B shows a "File" pull-down menu, FIG. 8C shows an "Edit" pull-down menu, FIG. 8D shows a "Pricing" pull-down menu, FIG. 8E shows a "Format" pull-down menu, FIG. 8F shows a "Window" pull-down menu, FIG. 8G shows a "Markets-Entities" data section of the "Markets" data section, FIG. 8H shows the "Markets-Credit Curves" data section of the "Markets" section, FIG. 8I shows the "Markets-LIBOR" data section of the "Markets" section, FIG. 8J shows the "Markets-Market Conventions" data section, FIG. 8K shows the complete "Details" data section of the "Details" data section, FIG. 8L shows sample "Configure" data for the gridded-square "Report" icon of the GUI (or its corresponding "Report" selection of a pull-down menu) of FIG. 8A, and FIG. 8M shows a sample "Chart" of the "Report" based on the sample "Configure" data of FIG. 8L.

In particular, the credit curve of FIGS. 8A and 8H shows the spread "pricing" (or other numerical attribute values for a particular category) structure for various terms for a financial instrument, such as a CDS, for a selected entity on a particular trading day. Thus, for example, for a CDS spread credit curve (based on five-year CDS spread data from a CDS buy/sell trading information database), CDS spread "pricing" may be provided for various maturity terms (such as, for example, six months, one year, two years, three years, four years, five years, seven years and ten years), shown in FIGS. 8A and 8H. The credit curve has a gradient or slope parameter a (which is described further below), and default probabilities may be determined from the base credit curve.

These default probabilities associated with the CDS spreads may be determined using the valuation and default probability methodology described in the papers "Valuing Credit Default Swaps I: No Counterparty Default Risk" by John Hull and Alan White, published in the *Journal of Derivatives*, Vol. 8, No. 1, (Fall 2000), pp. 29-40 vol., which is incorporated herein by reference in its entirety and in particular as to the default probability methodology described in that paper, and by "Valuing Credit Default Swaps II: Modeling Default Correlations" by John Hull and Alan White, published in the *Journal of Derivatives*, Vol. 8, No. 3, (Spring 2001), pp. 12-22, which is also incorporated herein by reference in its entirety and in particular as to the default probability methodology described in that paper.

In the CDS spread (or other financial instrument or credit derivative) pricing software of FIG. 8A, the software may have information on certain entities but not others. The software may provide a list of the tracked entities to a user through the graphical user interfaces (GUIs) of FIGS. 8A to 8M. If the user enters an entity name that is not on the entity list, the user must supply the entity credit curve information, which may be based on the credit curve information for a similar entity. Thus, for example, if Daimler-Chrysler Co. is not on the list, it may be priced based on the spread credit curve information for Ford Motor Company.

As described above, the trading information database 260, for example, may include trading statistics primarily for five-year CDS spreads, so that the system estimates the five-year CDS spreads for one or more entities for each credit rating category on a particular day, for which there are no actual observations. For example, if 85% of the trading data in the database reflects bid and offer quotes for five-year CDS spreads, then the indexes described herein would be for five-year CDS instruments.

To complete the credit curve beyond the base-term maturity of five-year CDS spreads, however, the system in step 340 also determines estimates of non-five-year spreads for each of the entities for each credit rating category on a particular day. Accordingly, when there are bid and offer quotes for a CDS instrument having a maturity term that is different than five years, a CDS spread observation for a maturity term other than five years may be calculated or determined in the same manner in which the system determines five-year spread observations. This includes applying the same criteria described above to ensure that the maxbid and minoffer are sufficiently close and therefore not too far apart.

A model for relating non-five-year spreads to five-year spreads may be as follows: Spread(k)=Spread(5)+a*Spread(5)*(k–5), where Spread(k) is the spread for a k-year CDS instrument having a k-year term. Once the parameter a (which is the slope or gradient of the credit curve) has been estimated, the system may determine estimates for all non-five-year CDS spreads from the estimates of five-year CDS spreads. More generally, the model may be expressed as follows: Spread(k)=Spread (BM)+a*Spread(BM)*(k–BM), where BM is the base maturity term, which in the specific example is 5 years. This model is used to provide the credit curve data for non-five-year maturities in FIGS. 8A and 8H, where the gradient or slope parameter a is displayed.

The system determines the slope or gradient parameter a of the credit curve by using a regression analysis in which the weights assigned to the observations are decreased exponentially as the system looks or searches for observations further back in time. To provide an initialization or stabilization period, the exemplary method begins by observing non-five-year data M days before the start date for the spread-level index. A value of 80 days for M is believed to work well with a database largely based on five-year CDS spread trading data, but M may vary depending on the nature of the particular observation data. The first M days of observations constitute the initialization or stabilization period.

For each non-five-year observation on each day, the system first attempts to determine an estimate of the corresponding five-year spread using the first and second steps described above for estimating five-year spreads for entities. If the corresponding five-year spread is not determinable or if the five-year spread is more than three times the level of the spread-level index, then the system discards the data. The system may discard the data when the estimated five-year spread is more than three times the spread-level index to eliminate extreme observations that may not be representative of the particular rating category. An example of an "extreme" observation from the A-rated category is an entity such as, for example, WorldCom, which in the first few months of 2002, had a five-year spread of about 600 and a 1-year spread of about 800. In contrast, it is believed that many or most A-rated companies had a five-year spread that was greater than—and not less than—the 1-year spread. Accordingly, it is believed that it may be inappropriate or less predictive to use such "extreme" data to estimate anything about the term structure of credit spreads for "typical" companies having an A credit rating.

If after the data filtering described above, there are, for example, $m_i$ non-five-year spread observations on day I, in the exemplary method as applied to CDS instruments, the following parameters may be defined as follows: $U_{ij}$ as the spread for the non-five-year CDS for the jth observation on day i; $V_{ij}$ as the spread for the corresponding five-year CDS for the jth observation on day i; $T_{ij}$ as the life of non-five-year CDS for the jth observation on day i; $X_{ij}$ as $V_{i,j}(T_{i,j} - 5)$; $y_{i,j}$ as $U_{i,j} - V_{i,j}$; $\alpha_i = \sum_{j=1}^{m_i} x_{i,j} y_{i,j}$; and $\beta_i = \sum_{j=1}^{m_i} x_{i,j}^2$.

The value of the slope or gradient parameter a of the credit curve on day i is given by $A_i/B_i$, where $A_i$ and $B_i$ are parameters that may be updated by the system each day. They are first calculated on day M from the M days of the initialization or stabilization period. On day M, the parameter $w_M=1-\lambda$, where $\lambda$ is a parameter used to provide the effect of exponentially decreasing the weights assigned to the observations, and whose value is described below as 0.99 based on five-year CDS trading data. For values of i from 1 day to M−1 days, the system uses $w_i = \lambda w_{i+1}$. The initial values of $A_M$ and $B_M$ are as follows:

$$A_M = \frac{\sum_{i=1}^{M} w_i \alpha_i}{\sum_{i=1}^{M} w_i}$$

$$B_M = \frac{\sum_{i=1}^{M} w_i \beta_i}{\sum_{i=1}^{M} w_i}$$

For i greater than M days, the system determines $A_i$ and $B_i$ as follows: $A_i = \lambda A_{i-1} + (1-\lambda)\alpha_i$; and $B_i = \lambda B_{i-1} + 1 - \lambda)\beta_i$.

As described above, the exemplary method and system determines the conditional index (the spread-change index for CDS spreads) and the unconditional index (the spread-level index for CDS spreads) and CDS spread estimates by using four parameters: $N_1$, $N_2$, $N_3$, and $\lambda$. Based on the five-year CDS spread data of an exemplary CDS/trading database, in which about 85% of the data was for five-year CDS instruments, the exemplary values for these parameters may be $N_1 = 5$ days, $N_2 = 30$ days, $N_3 = 50$ days, and $\lambda = 0.99$, where $\lambda$ is used to exponentially decrease the observation data as the data becomes older, as described herein.

Figure 4:
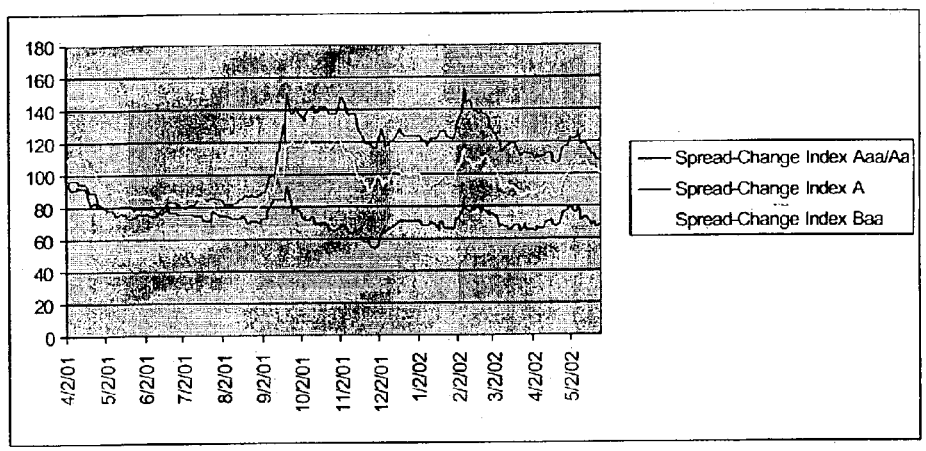
FIG. 4 shows how the conditional indices for five-year CDS spreads varied for the period between Apr. 1, 2001 and May 24, 2002, based on trading data for five-year CDS spreads.
Figure 5:
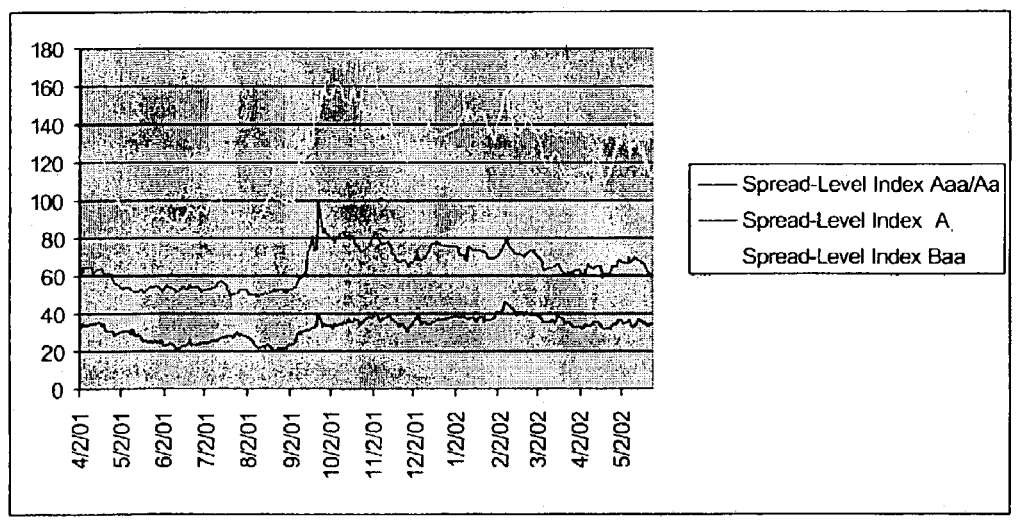
FIG. 5 shows how the unconditional indices for five-year CDS spreads varied for the period between Apr. 1, 2001 and May 24, 2002, based on trading data for five-year CDS spreads. These are referred to as spread-level indices in the figure.
Figure 6:
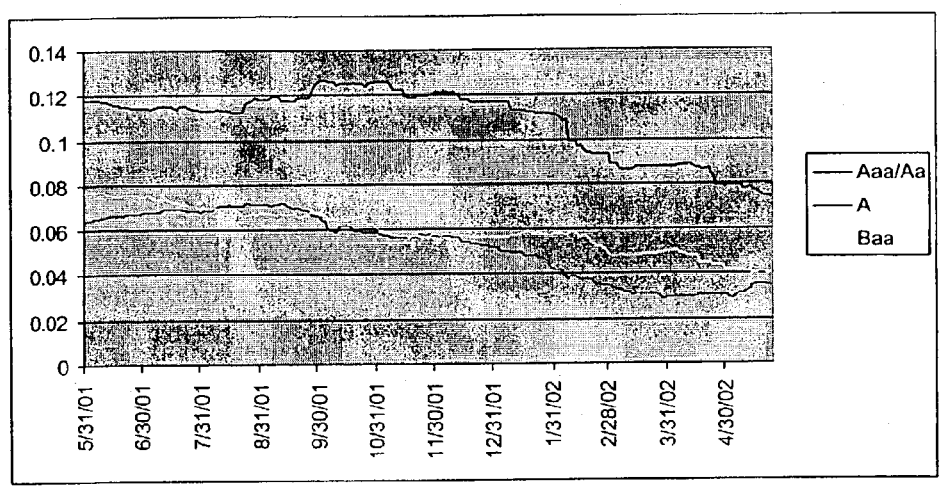
FIG. 6 shows the parameter a for the period May 31, 2001 to May 24, 2002, where the parameter a is the gradient or slope of a credit curve based on trading data for non-five-year CDS spreads.
Figure 7:
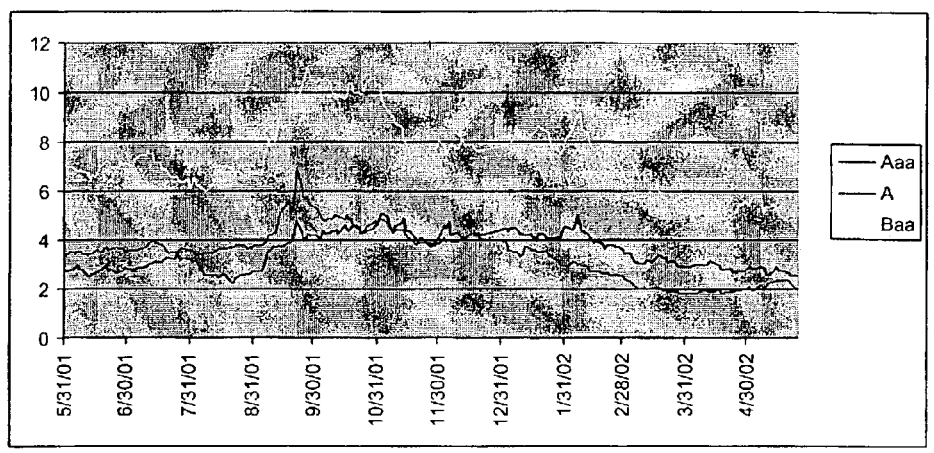
FIG. 7 shows the gradient or slope parameter a of the credit curve as multiplied by the spread-level index to give an estimate of the basis-point-spread (bps) increase in the CDS spread per year.

For different credit rating categories and for the five-year CDS spread data, FIG. 4 shows the conditional indices (e.g., spread-change indices) and how they varied between Apr. 1, 2001 and May 24, 2002, FIG. 5 shows the unconditional indices (e.g., spread-level indices) between Apr. 1, 2001 and May 24, 2002, FIG. 6 shows the gradient or slope parameter a of the credit curve based on trading data for non-five-year CDS spreads for the period May 31, 2001 to May 24, 2002, and FIG. 7 shows the gradient or slope parameter a of the credit curve as multiplied by the spread-level index to provide an estimate of the basis-point-spread (bps) increase in the CDS spread per year.

Thus, the exemplary method may be used to estimate five-year CDS spreads. For the estimation, it is assumed that the CDS spread for a particular company behaves in the same way as CDS spreads for other similar companies. To estimate the CDS spread for a particular A-rated company on November 15, for example, the following may be assumed: (1) the most recent, reliable information available on the company was on November 8 when the maximum bid and minimum offer for the particular company were 100 and 120 basis points, respectively; and (2) spreads for A-rated names have increased by 5% on average between November 8 and November 15. The estimate for the spread on November 15 would then be the mid-market spread on November 8 grossed up by 5%. That is, it would be 110×1.05=115.5.

The estimate of a non-five year CDS spread is based on the slopes of the lines that relate CDS spread to CDS life for different rating categories. If, for example, on November 15, it is estimated that CDS spreads for A-rated companies increase by 3% for each year of the life of the CDS, then the 7-year CDS spread for the company in the example would be 115.5+2×0.03×115.5=122.43. The estimates assume that the CDS spread for the company under consideration moves similarly to the CDS spreads for other companies with similar credit ratings. If there have been no recent updates about the creditworthiness of the company, the estimate may be very good. If new updates have recently been released causing the market to revise its opinion about the company, the estimate may be less favorable.

To test the procedure for estimating CDS spreads, the following inquiry may be made for each company on each day for which there were bids and offers that were reasonably close together: "If the bids and offers had not been observed, what would have been the estimated CDS spread?" The "error" may then be determined as the absolute difference in basis points between the estimate and the mid-point between the maximum bid and minimum offer. Results for the period April 2001 to May 2002 are summarized in Table 1. The calculated error may overstate the actual error as the market CDS spread could be anywhere between the maximum bid and the minimum offer.

TABLE 1

|  | Aaa/Aa | A | Baa |
| --- | --- | --- | --- |
| Median Error (bps) | 1.16 | 2.01 | 3.82 |
| Upper Quartile Error (bps) | 2.90 | 4.48 | 8.97 |
| Average of Difference Between MinOffer and MaxBid (bps) | 7.45 | 11.13 | 20.12 |
| Number of Estimates Tested | 2,659 | 9,585 | 8,170 |

In Table 1, it is shown that 2,659 tests were performed for Aaa/Aa companies. In 50% of the cases, errors were less than 1.16 basis points and in 75% of the cases errors were less than 2.90 basis points. The average spread between the minimum offer and maximum bid observed was 7.45 basis points. This means that the market CDS spread could be different from what is assumed to be the true CDS spread by as much as 3.725 basis points on average. The results for other rating categories may be interpreted similarly. Available non-five-year CDS trading data for testing the accuracy of the estimates on non-five-year spreads indicates that the errors should be comparable or similar to those for five-year spreads.

As explained above, the trading information database 260 is updated each day to include determined bid (buy) quote and offer (sell) quote trading "observations." In particular, when there are both bid and offer quotes for a CDS for a particular name on a particular day and the bid-offer spread is sufficiently small (according to criteria described herein), the system determines an observation for that name and that day as 0.5*(maxbid+minoffer), where maxbid is the maximum of the bids on the day and minoffer is the minimum of the offers on the day.

The spread-change index is calculated using the model of $\ln(x_{ij}) = \ln(a_j I_i) + \ln(e_{ij})$, where $I_i$ is the index on day i, $x_{ij}$ is the five-year spread for the jth company on day j, $a_j i$, $a_j$ is a constant for company j, and the $e_{ij}$ are independent, identically distributed variables. In this equation the five-year spread for a particular entity (company or name) has a component that depends on the index level and a component that is unique to the entity (company or name), and the system uses available maximum likelihood estimator statistical techniques to estimate the spread-change index $I_i$. The spread-change index for Apr. 1, 2001 to May 24, 2002 is shown in FIG. 4, in which the indices for all rating categories were set equal to 100 on Jan. 1, 2001.

The system determines the spread-level index for a rating category on a particular day as the average of a set of five-year spreads. The set consists of a five-year spread observations for names in that category on that day, and five-year spread estimates for other names on that day calculated using the spread-change index. The objective is to ensure that the set of names over which the average is determined remains reasonably stable through time. The spread-level index for Apr. 1, 2001 to May 24, 2002 is shown in FIG. 5.

Also, as described herein, the five-year spread for a name on a day is estimated as follows: (1) if there is an observation for the five-year spread for the name on the day, then the 5-year spread is set equal to that observation; (2) if there is no observation for the five-year spread for the name on the day, but there are recent such observations, then the five-year spread is estimated from the recent observations using the spread-change index; and (3) if there are no recent observations for the five-year spread for the name, then the five-year spread is set equal to the spread-level index.

In the exemplary method and system described above, the spread-change index and the spread-level index are determined or updated once a day. They may also be updated on a continual basis or intra-day basis. In particular, the method and system may be used to determine the spread-change index and the spread-level index at a particular time during the day in the same manner as if it were the end of the trading day. This means that an index for a particular rating category may be updated when there are new observations on a sufficient number of entities (such as, for example, five entities) in the credit rating category, and when for each of these entities there is also at least one observation in the last $N_1$ days.

In particular, the above-described methods and system may be used to determine estimates of five-year CDS spreads on particular entities, and these may be updated on an intra-day basis. As described above, using the methods described herein, the system determines the value of an observation for an entity on a particular day, by setting the observation equal to 0.5*(maxbid+minoffer), where maxbid is the maximum of all bid quotes during the day and minoffer is the minimum of all offer quotes during the day. To use this method when there is intra-day updating of the observation, the system determines maxbid and minoffer from all bid and offer quotes up to a particular time on that particular day, where recent bid and offer quotes would be the most relevant.

To better understand the spread-change index and the spread-level index described herein, it should be understood that they may behave differently, as evidenced by the following analogy. To construct an annual index of the ages of people in the United States, the increase in the index each year may be set equal to the average increase in the age of people who are alive at both the beginning of the year and at the end of the year, or the index each year may be set equal to the average age of the population. The first index grows at the rate of 1 year per year. The second index may be growing, but much more slowly.

The spread-change index of CDS spreads is analogous to the first index of age, and the spread-level index is analogous to the second index of age. Consider the A rating category, where companies in the category appear on average to be getting less credit-worthy with the passage of time. As a result, the average change in the CDS spread for a group of A-rated companies may increase so long as the companies continue to have an A credit rating. This increase is measured by the spread-change index. When the credit-worthiness of one of the companies declines to below a certain level, the company is downgraded and therefore leaves the A-rated sample. Also, there are periodic infusions of new A-rated companies because of downgrades from higher ratings. This is analogous to births and deaths in the above aging example. As a result, the percentage change in the average CDS spread for A-rated companies (which is measured by the spread-level index) may tend to be not as great as the percentage change in the spread-change index.

What is claimed is:

1. A method for determining an estimate of at least one numerical attribute of at least one entity of a population of entities, in which the population changes and there are a limited number of observations on the at least one numerical attribute for the at least one entity, the method comprising:

using a processor arrangement to determine a conditional index to track how a value of the at least one numerical attribute changes from one time to another for an entity, wherein the entity is a member of the population at both times;

using the processor arrangement to determine an unconditional index representing an average level of the attribute for the entities that are in the population at a particular time;

using the processor arrangement to estimate an attribute for at least one of each of the entities for which there is no actual attribute data; and displaying on a display a graphical-user-interface to display a data curve for the at least one entity based on the at least one numerical attribute, wherein the data curve includes numerical attributes determined using the conditional index and the unconditional index;

wherein the determining of the conditional index for the particular time is performed by calculating a maximum likelihood estimator for the conditional index for the particular time, wherein an entity is considered if it satisfies the following conditions: (1) the entity is currently a member of the population of interest; and (2) the entity was a member of the population at the time of the most recent observation on the entity, and wherein the unconditional index is determined by averaging the attribute across both actual observations and estimated observations of the attribute that satisfy both of the conditions.

2. The method of claim 1, wherein the conditional index for a particular time and for a particular entity is determined based on prior conditional indices, actual attribute data for the particular time and actual attribute data for the prior times.

3. The method of claim 1, wherein the relationship between the numerical attribute and the conditional index is defined by a model of xij=Ii+aj+eij, wherein xij is an attribute value of a jth entity of the population on day i, Ii is the level of the conditional index on day i, aj is a constant associated with the jth entity of the population on day i, and each eij has independent identically distributed distributions.

4. The method of claim 3, further comprising:
estimating an attribute for at least one of each of the entities for which there is no actual attribute data, wherein the attribute for xij is defined as xi−k,j+Ii−Ii−k, and an actual attribute value was last observed on day i−k, which is k days before the day i.

5. The method of claim 1, wherein the relationship between the numerical attribute and the conditional index is defined by a model of 1n(xij)=1n(Ii)+1n (aj)+1n(eij), wherein xij is an attribute value of the jth entity of the population on day i, Ii is the level of the conditional index on day i, aj is a constant associated with the jth entity of the population on day i, and each eij has independent identically distributed distributions.

6. The method of claim 5, further comprising:
estimating an attribute for at least one of each of the entities for which there is no actual attribute data, wherein the attribute for xij is defined as xi−k,j (Ii/Ii−k), and an actual attribute value was last observed on day i−k, which is k days before the day i.

7. The method of claim 1, wherein the unconditional index is determined based on the actual attribute data and the estimated attribute data.

8. The method of claim 1, wherein the unconditional index is determined for the particular time for each of the entities that is currently a member of the population, and that was a member of the population when a most recent attribute value of the member was observed.

9. The method of claim 1, wherein the population includes a group of companies having the same credit rating.

10. The method of claim 1, wherein the attribute data includes credit derivative pricing data.

11. The method of claim 1, wherein the attribute data includes credit default swap spread data for five-year credit default swaps.

12. An apparatus for determining an estimate of at least one numerical attribute of at least one entity of a population of entities, in which the population changes and there are a limited number of observations on the at least one numerical attribute for the at least one entity, comprising:
a processor arrangement including:
a first processor arrangement to determine a conditional index to track how a value of the at least one numerical attribute changes from one time to another for an entity, wherein the entity is a member of the population at both times;
a second processor arrangement to determine an unconditional index representing an average level of the attribute for the entities that are in the population at a particular time; and
a third processor arrangement to estimate an attribute for at least one of each of the entities for which there is no actual attribute data;
wherein the determining of the conditional index for the particular time is performed by calculating a maximum likelihood estimator for the conditional index for the particular time,
wherein an entity is considered if it satisfies the following conditions: (1) the entity is currently a member of the population of interest; and (2) the entity was a member of the population at the time of the most recent observation on the entity, and
wherein the unconditional index is determined by averaging the attribute across both actual observations and estimated observations of the attribute that satisfy both of the conditions.

13. The apparatus of claim 12, wherein the relationship between the numerical attribute and the conditional index is defined by a model of xij=Ii+aj+eij, wherein xij is an attribute value of a jth entity of the population on day i, Ii is the level of the conditional index on day i, aj is a constant associated with the jth entity of the population on day i, and each eij has independent identically distributed distributions.

14. The apparatus of claim 13, further comprising:
an estimating arrangement to estimate an attribute for at least one of each of the entities for which there is no actual attribute data, wherein the attribute for xij is defined as xi−k,j+Ii−Ii−k, and an actual attribute value was last observed on day i−k, which is k days before the day i.

15. The apparatus of claim 12, wherein the relationship between the numerical attribute and the conditional index is defined by a model of ln (xij)=1n(Ii)+1n(aj)+ln (eij), wherein xij is an attribute value of the jth entity of the population on day i, Ii is the level of the conditional index on day i, aj is a constant associated with the jth entity of the population on day i, and each eij has independent identically distributed distributions.

16. The apparatus of claim 15, further comprising:
an estimating arrangement to estimate an attribute for at least one of each of the entities for which there is no actual attribute data, wherein the attribute for xij is defined as xi−k,j (Ii/Ii−k), and an actual attribute value was last observed on day i−k, which is k days before the day i.

17. A computer-readable storage medium including a computer program, the computer program being executable by a processor, comprising:
a program code arrangement having program code for determining an estimate of at least one numerical attribute of at least one entity of a population of entities, in which the population changes and there are a limited number of observations on the at least one numerical attribute for the at least one entity, by performing the following:
determining a conditional index to track how a value of the at least one numerical attribute changes from one time to another for an entity, wherein the entity is a member of the population at both times;
determining an unconditional index representing an average level of the attribute for the entities that are in the population at a particular time; and
estimating an attribute for at least one of each of the entities for which there is no actual attribute data;
wherein the determining of the conditional index for the particular time is performed by calculating a maximum likelihood estimator for the conditional index for the particular time,
wherein an entity is considered if it satisfies the following conditions: (1) the entity is currently a member of the population of interest; and (2) the entity was a member of the population at the time of the most recent observation on the entity, and
wherein the unconditional index is determined by averaging the attribute across both actual observations and estimated observations of the attribute that satisfy both of the conditions.

18. The computer-readable storage medium of claim 17, wherein the relationship between the numerical attribute and the conditional index is defined by a model of xij=Ii+aj+eij, wherein xij is an attribute value of a jth entity of the population on day i, Ii is the level of the conditional index on day i, $a_j$ is a constant associated with the jth entity of the population on day i, and each $e_{ij}$ has independent identically distributed distributions.

19. The computer-readable storage medium of claim 18, further comprising:

estimating an attribute for at least one of each of the entities for which there is no actual attribute data, wherein the attribute for $x_{ij}$ is defined as $x_{i-k,j} + I_i - I_{i-k}$, and an actual attribute value was last observed on day i−k, which is k days before the day i.

20. The computer-readable storage medium of claim 17, wherein the relationship between the numerical attribute and the conditional index is defined by a model of $\ln(x_{ij}) = \ln(I_i) + \ln(a_j) + \ln(e_{ij})$, wherein $x_{ij}$ is an attribute value of the jth entity of the population on day i, $I_i$ is the level of the conditional index on day i, $a_j$ is a constant associated with the jth entity of the population on day i, and each $e_{ij}$ has independent identically distributed distributions.

21. The computer-readable storage medium of claim 20, further comprising:

estimating an attribute for at least one of each of the entities for which there is no actual attribute data, wherein the attribute for $x_{ij}$ is defined as $x_{i-k,j}(I_i/I_{i-k})$, and an actual attribute value was last observed on day i−k, which is k days before the day i.

* * * * *

UNITED STATES PATENT AND TRADEMARK OFFICE
CERTIFICATE OF CORRECTION

PATENT NO. : 7,818,235 B2  
APPLICATION NO. : 10/366500  
DATED : October 19, 2010  
INVENTOR(S) : John Campbell Hull et al.

Page 1 of 1

It is certified that error appears in the above-identified patent and that said Letters Patent is hereby corrected as shown below:

In the Specifications:

Column 2, line 49, change "1n($x_{ij}$)=1n($I_i$)+1n ($a_j$)+1n ($e_{ij}$)," to -- ln($x_{ij}$)=ln($I_i$)+ln ($a_j$)+ln ($e_{ij}$), --;

Column 6, lines 32-33, change  
"1n$x_{ij}$=1n $I_i$+1n $a_j$+1n($e_{ij}$) (which may also be expressed as 1n$x_{ij}$=1n ($a_j I_i$)+1n($e_{ij}$))," to  
-- ln $x_{ij}$=ln $I_i$+ln $a_j$+ln($e_{ij}$) (which may also be expressed as ln$x_{ij}$=ln ($a_j I_i$)+ln($e_{ij}$)), --;

Column 9, lines 54-55, change "$u_j$=1n $I_{n-k(j)}$+1n $x_{n,j}$-1n$x_{n-k(j),j}$" to -- $u_j$=ln $I_{n-k(j)}$+ln $x_{n,j}$-ln$x_{n-k(j),j}$ --;

Column 15, line 2, change "1n($x_{ij}$)=1n ($a_j I_i$)+1n($e_{ij}$)," to -- ln($x_{ij}$)=ln ($a_j I_i$)+ln($e_{ij}$), --;

In the Claims:

Column 17, line 11, change "1n(xij)=1n(Ii)+ 1n(aj)+1n(eij)," to -- ln(xij)=ln(Ii)+ln(aj)+ln(eij), --

Column 18, line 17, change "ln (xij)=1n(Ii)+1n(aj)+ln (eij)," to -- ln (xij)=ln(Ii)+ln(aj)+ ln (eij), --

Column 19, line 14, change "1n(xij)= 1n(Ii)+" to -- ln(xij) = ln(Ii) + --

Column 20, line 1, change "1n(aj)+1n(eij)," to -- ln(aj) + ln(eij), --

Signed and Sealed this  
Twenty-first Day of May, 2013

Teresa Stanek Rea  
*Acting Director of the United States Patent and Trademark Office*